(12) United States Patent
Shiraishi

(10) Patent No.: US 9,741,504 B2
(45) Date of Patent: Aug. 22, 2017

(54) ELECTRONIC COMPONENT HAVING MOVABLE CONTACT

(71) Applicant: OMRON Corporation, Kyoto (JP)

(72) Inventor: Rie Shiraishi, Akaiwa (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 14/424,421

(22) PCT Filed: Sep. 18, 2013

(86) PCT No.: PCT/JP2013/075092
§ 371 (c)(1),
(2) Date: Feb. 26, 2015

(87) PCT Pub. No.: WO2014/050643
PCT Pub. Date: Apr. 3, 2014

(65) Prior Publication Data
US 2015/0206670 A1    Jul. 23, 2015

(30) Foreign Application Priority Data
Sep. 25, 2012  (JP) .................................. 2012-211404

(51) Int. Cl.
*H01H 5/00* (2006.01)
*H01H 13/06* (2006.01)
(Continued)

(52) U.S. Cl.
CPC .............. *H01H 13/06* (2013.01); *C08G 65/14* (2013.01); *C08G 65/24* (2013.01); *C08L 71/03* (2013.01);
(Continued)

(58) Field of Classification Search
CPC .......... H01H 5/00; H01H 9/041; H01H 13/06; H01H 13/10; H01H 13/14; H01H 13/26; H01H 13/40; H01H 9/00; H01H 9/02; H01H 9/04; H01H 9/0264; H01H 9/042; H01H 9/30; H01H 9/32; H01H 2009/04; H01H 2009/048; H01H 2009/30;
(Continued)

(56) References Cited

U.S. PATENT DOCUMENTS

| 4,952,633 A * | 8/1990 | Maeda ..................... C08L 71/02 525/187 |
| 5,447,992 A * | 9/1995 | Horvath .................... C08L 9/02 525/187 |

FOREIGN PATENT DOCUMENTS

| JP | 10-302593 | 11/1998 |
| JP | 2003-157742 | 5/2003 |

(Continued)

OTHER PUBLICATIONS

Extended European Search Report, from counterpart European Patent Application No. 13842702.6, dated Jul. 29, 2015, 7 pages.
(Continued)

*Primary Examiner* — Anthony R. Jimenez
(74) *Attorney, Agent, or Firm* — Klarquist Sparkman, LLP

(57) ABSTRACT

An electronic component comprising: a case; a switching mechanism incorporated within the case; an actuator configured to actuate the switching mechanism, the actuator being mounted in the case so as to be displaceable by sliding; and a rubber cap configured to seal a sliding part of the actuator, wherein the rubber cap is made of a hydrin-based rubber.

5 Claims, 6 Drawing Sheets

(51) Int. Cl.
*H01H 9/04* (2006.01)
*C08L 71/03* (2006.01)
*H01H 13/10* (2006.01)
*H01H 13/14* (2006.01)
*H01H 13/26* (2006.01)
*C08G 65/14* (2006.01)
*C08G 65/24* (2006.01)
*H01H 13/40* (2006.01)

(52) U.S. Cl.
CPC .......... *H01H 9/041* (2013.01); *H01H 13/063* (2013.01); *H01H 13/10* (2013.01); *H01H 13/14* (2013.01); *H01H 13/26* (2013.01); *H01H 13/40* (2013.01)

(58) Field of Classification Search
CPC ....... H01H 2009/305; H01H 2009/347; H01H 2201/022; H01H 2201/03; H01H 2201/032; C08G 65/14; C08G 65/24; C08L 71/03
USPC ........................................................ 200/402
See application file for complete search history.

(56) References Cited

FOREIGN PATENT DOCUMENTS

| | | |
|---|---|---|
| JP | 2006-351391 | 12/2006 |
| JP | 2007-42359 | 2/2007 |
| JP | 2009 059523 | 3/2009 |

OTHER PUBLICATIONS

Brandrup et al., *Polymer Handbook* (4$^{th}$ Edition), John Wiley & Sons, New York, United States, Jan. 1, 1999, pp. 566-569, 6 pages.
Blackley, *Synthetic Rubbers: Their Chemistry and Technology*, Applied Science Publishers, Barking, Essex, Great Britain, Jan. 1, 1983, pp. iv-v, 174-177, and 240-243, 6 pages.
International Search Report and English Translation for corresponding PCT/JP2013/075092, dated Oct. 15, 2013, 4 pages.
Office Action (in Chinese language) issued Feb. 15, 2016, by the State Intellectual Property Office of the People's Republic of China for corresponding Chinese Patent Application No. 201380044526.3, 6 pp.
Ying Guan et al., "Current circumstance of special rubbers and the demand forecast thereof in China (I)", *China Rubber*, pp. 10-15, Dec. 31, 2008 (Chinese language with English summary).

* cited by examiner

Rate of weight change (%) after immersion of rubbers in respective types of grease in a 90°C-atmosphere for 96 hours

| Type of grease for immersion | Silicone rubber | Hydrin-based rubber | |
|---|---|---|---|
| | | #1 (with plasticizer more added) | #2 (with plasticizer less added) |
| Olefin-based grease | +8 | −10 | −6 |
| Paraffin-based grease | +6 | −4 | −3 |
| Ester-based grease | +9 | −13 | −6 |

Fig. 8

Gehman torsion test (°C)

|  | Silicone rubber | Hydrin-based rubber | |
|---|---|---|---|
|  |  | #1 (with plasticizer more added) | #2 (with plasticizer less added) |
| T2 | −40.1 | −47.4 | −41 |
| T5 | −40.5 | −51 | −45.7 |
| T10 | −41.1 | −52.9 | −47.3 |
| T100 | −49.3 | −55.9 | −51.4 |
| Tg | −42.7 | −53.1 | −49.7 |

ELECTRONIC COMPONENT HAVING MOVABLE CONTACT

CROSS-REFERENCE TO RELATED APPLICATION

This application is based on Japanese Patent Application No. 2012-211404 filed with the Japan Patent Office on Sep. 25, 2012, the entire contents of which are incorporated herein by reference.

FIELD

The present invention relates to an electronic component having a movable contact, such as a switch device.

BACKGROUND

In the field of switch devices, for example, microswitches are widely used in which a switching mechanism is embedded in a switch case, and a movable piece in the switching mechanism is configured to move in response to sliding displacement of a push button serving as an actuator, so that a snap-action movement is effected in order to switch on or off the conduction between terminals (for example, see Patent Document 1—Japanese Laid-Open Patent Publication No. 2006-351391).

Some of the microswitches may be used in an environment where silicone-based materials which generate a siloxane gas are present. Materials such as a silicone-based adhesive or silicone grease, may be used in the vicinity of the microswitch or within the enclosed space where the microswitch is located. If the siloxane gas enters into a case of the microswitch, the gas can cause insulating materials such as $SiO_2$ to be deposited on a surface of a contact provided in the switching mechanism, thus resulting in contact failure.

In order to prevent the deposition of insulating materials, several attempts have been made to create a sealed structure of a microswitch, for example, by sealing connection part of a switch case and covering sliding part of a push button with a rubber cap, or covering the part with a gasket.

For a rubber cap or a gasket, a silicone rubber is frequently used. When a silicone rubber is employed to form a rubber cap or a gasket, the silicone rubber is usually subjected to "secondary vulcanization." This is carried out for the purpose of preventing deposition of insulating materials from occurring due to the siloxane gas remaining even after molding of the rubber. The secondary vulcanization is useful to remove the residual siloxane gas, but makes the product production or quality control cumbersome.

Another problem in use of a silicone rubber is that, even if the silicone rubber is subjected to the secondary vulcanization, the silicone rubber has a chemical property of being rough in its intermolecular bond, and thus allowing gases to easily pass through.

On the other hand, Patent Document 2 (Japanese Laid-Open Patent Publication No. 2007-042359) discloses a microswitch in which a gasket made of an ethylene/propylene-based copolymer rubber covers the outside of an entire operation button, which corresponds to the push button, to create a sealed state. Patent Document 2 describes that: an ethylene/propylene-based copolymer rubber is used as a material for the gasket; and this makes it possible to prevent the entry of dust, liquids, or gases into the inside of the switch through a coupled portion between the gasket and the operation button from occurring due to up-and-down motion of the operation button, which corresponds to the push button, at the time of actuating the switch. Patent Document 2 also describes that the use of an ethylene/propylene-based copolymer rubber makes it possible to omit the secondary vulcanization procedure for removing the residual siloxane component, and thus facilitating the production of the gasket.

The ethylene/propylene-based copolymer rubber used in the gasket of Patent Document 2, however, has the property of swelling by absorbing grease or other oils. Grease, which is a lubricant, is commonly used for an electronic component, particularly in a switching mechanism, or a plunger portion enabling the sliding displacement of a push button, etc. Further, some switch devices are mounted in automobiles or the like, and various oils are used in automobiles. Thus, there is a problem with the use of a switch device having a gasket made of an ethylene/propylene-based copolymer rubber which is poor in oil resistance, because such a gasket will be deteriorated due to oil adhesion, and as a result, the sealed structured of the device is not maintained in the long-term.

SUMMARY

According with one aspect of an embodiment of the present invention, there is provided an electronic component comprising: a case; a switching mechanism incorporated within the case; an actuator configured to actuate the switching mechanism, the actuator being mounted in the case so as to be displaceable by sliding; and a rubber cap configured to seal a sliding part of the actuator, wherein the rubber cap is made of a hydrin-based rubber.

BRIEF DESCRIPTION OF THE DRAWINGS

FIG. 8 is an illustration showing results of a flexibility test on a hydrin-based rubber and a silicone rubber under a low-temperature environment.

DETAILED DESCRIPTION

Embodiments of the present invention have been devised in view of the problems described earlier, and an object of the present invention is to provide an electronic component having a movable contact, the electronic component being capable of maintaining a sealed structure for a long time while reducing effect of gases such as a siloxane gas.

In view of the problems described earlier, an embodiment of the present invention provides an electronic component including: a case; a switching mechanism incorporated within the case; an actuator configured to actuate the switching mechanism, the actuator being mounted in the case so as to be displaceable by sliding; and a rubber cap configured to seal a sliding part of the actuator, in which the rubber cap is made of a hydrin-based rubber.

In the above embodiment, the rubber cap is made of a hydrin-based rubber. Therefore, even if the electronic component is used under such an environment that a siloxane gas is volatilized from a silicone-based material, the siloxane gas is prevented from entering the case through the rubber cap, so that the deposition of a silicon oxide on a surface of the contact in the switching mechanism may be effectively prevented from occurring. Thus, the contact failure can be reduced.

Further, the hydrin-based rubber is excellent in oil resistance. Therefore, even if the electronic component is used under such an environment that grease or other oils are likely to adhere to the rubber cap. In turn, it is ensured that absorption of the adherent oil is suppressed to prevent deterioration of the rubber cap. Thus, the sealed structure of the electronic component can be maintained for a long period of time.

The above embodiment of the present invention is beneficial in that it provides an electronic component having a movable contact, the electronic component being capable of maintaining the sealed structure for a long time while reducing effect of gases such as a siloxane gas.

Figure 1:
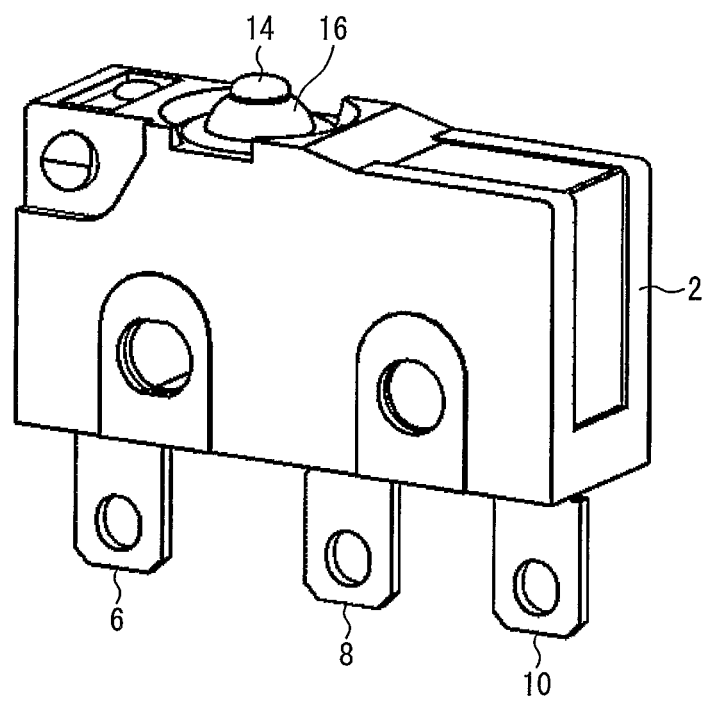
FIG. 1 is an oblique perspective view of a microswitch according to one embodiment of the present invention.
Figure 2:
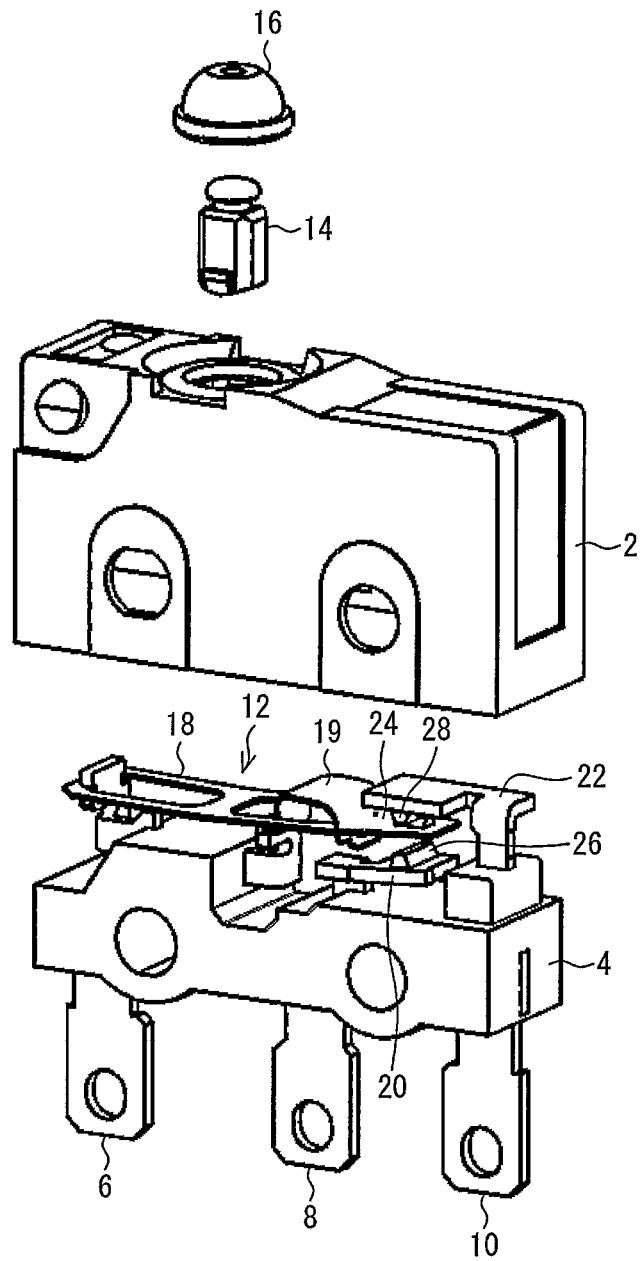
FIG. 2 is an exploded perspective view of the microswitch of FIG. 1.
Figure 3:
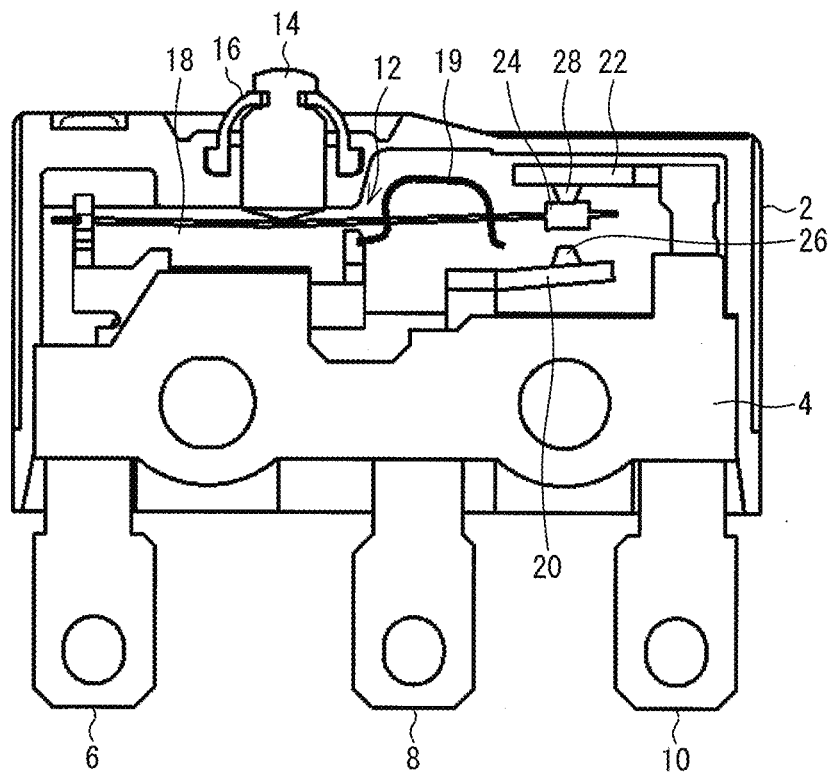
FIG. 3 is a cross-sectional view of the microswitch of FIG. 1.

The following will describe an embodiment of the present invention in detail. FIG. 1 is an oblique perspective view of a microswitch which is an electronic component according to an embodiment of the present invention. FIG. 2 is an exploded perspective view of the microswitch. FIG. 3 is a cross-sectional view of the microswitch.

As shown in FIGS. 1 to 3, a microswitch 1 of the embodiment includes: a case 2 made of a resin and a base 4 made of a resin. The base 4 is formed to fit with the case 2. The base 4 has three terminals, i.e. terminals 6, 8 and 10. The terminals 6, 8 and 10 and the base 4 are integrally molded by insert molding at the time of formation of the base 4. The terminals 6, 8 and 10 enable the microswitch 1 to be connected with an external conductor.

In the case partitioned by the case 2 and the base 4, a snap-action type switching mechanism 12 is provided internally. Further, the microswitch 1 includes: a push button 14 mounted in the case 2, the push button 14 being an actuator configured to be slidingly displaced; and a rubber cap 16 sealing a sliding part of the push button 14.

The snap-action type switching mechanism 12 includes: a movable piece 18 in the form of a leaf spring, the movable piece 18 having a rear anchor (the left end, in FIGS. 2 and 3) connected with an inner end of the terminal 6 which serves as a common terminal; a fixed piece 20 connected with an inner end of the terminal 8 which serves as a normally opened terminal; and a fixed piece 22 connected with an inner end of the terminal 10 which serves as a normally closed terminal. A spring piece 19 for snap action is provided between free end part of the movable piece 18 and central part thereof, the spring piece 19 being in an elastically curved state.

The movable piece 18 is cantilevered: that is, the movable piece 18 is anchored at one end connected with the terminal 6, so that the other end is swingable vertically and curvingly. A pair of the fixed pieces 20 and 22 are arranged one above the other so as to hold the free end of the movable piece 18 between the fixed pieces facing with each other.

A movable contact 24 is provided at the free end of the movable piece 18. The lower and upper surfaces of the movable contact 24 are faced with fixed contacts 26 and 28 which are provided on the fixed pieces 20 and 22, respectively. Vertical swing of the movable piece 18 allows the movable contact 24 to come into contact with the fixed contact 26 or 28, thereby giving a conductive state between the terminal 6 and the terminal 8, or a conductive state between the terminal 6 and the terminal 10.

As the push button 14 is pressed down, the movable piece 18 is displaced downward, so that the movable contact 24 comes into contact with the fixed contact 26 on the fixed piece 20. In the normal condition where the push button 14 is free from external force, the elastic restoring force of the spring piece 19 allows the free end side of the movable piece 18 to be energized and displaced upward, so that the movable contact 24 is kept in contact with the fixed contact 28 on the fixed piece 22.

The microswitch 1 has a structure in which the case 2 is coupled with the base 4 by an adhesive in an encapsulating manner, and as described above, the sliding part of the push button 14 is sealed with the rubber cap 16. That is, the microswitch 1 is so-called a drip-proof type microswitch. The rubber cap 16 is a rubber member for covering the sliding part of an actuator such as the push button 14. In the microswitch 1, the rubber cap 16 is mounted astride the push button 14 and the case 2.

FIGS. 1 to 3 show an exemplary structure in which the rubber cap 16 has a hole through which the upper part of the actuator protrudes. However, the rubber cap 16 can be holeless so that the actuator may be entirely covered including the upper part thereof. In other words, the form of the rubber cap 16 is not limited as long as it partially or entirely covers the upper part of the actuator.

In order to prevent the contact failure of the snap-action type switching mechanism 12 from occurring due to the entry of a siloxane gas into the case, in the microswitch 1, the rubber cap 16 is made of a hydrin-based rubber which is excellent in cold resistance and oil resistance, and also can suppress gas transmission.

Examples of the hydrin-based rubber include epichlorohydrin homopolymer (CO), epichlorohydrin-ethylene oxide copolymer (ECO), and epichlorohydrin-ethylene oxide-allyl glycidyl ether terpolymer (GECO). Of these, GECO is particularly preferable because of the excellent oil resistance and the excellent operability at low temperature.

The oil resistance/volume change rate of CO is as follows; ASTM No. 1: 0%, ASTM No. 3:10 to 20%, and Fuel B: approximately 20%. The minimum service temperature of CO is −15° C. The maximum service temperature of CO is 140° C.

The oil resistance/volume change rate of ECO is as follows; ASTM No. 1: 0%, ASTM No. 3: 10 to 20%, and Fuel B: approximately 30%. The minimum service temperature of ECO is −35° C. The maximum service temperature of ECO is 120° C.

The oil resistance/volume change rate of GECO is as follows; ASTM No. 1: 0%, ASTM No. 3: 10 to 20%, and Fuel B: approximately 35%. The minimum service temperature of GECO is −35° C. The maximum service temperature of GECO is 130° C.

Figure 4:
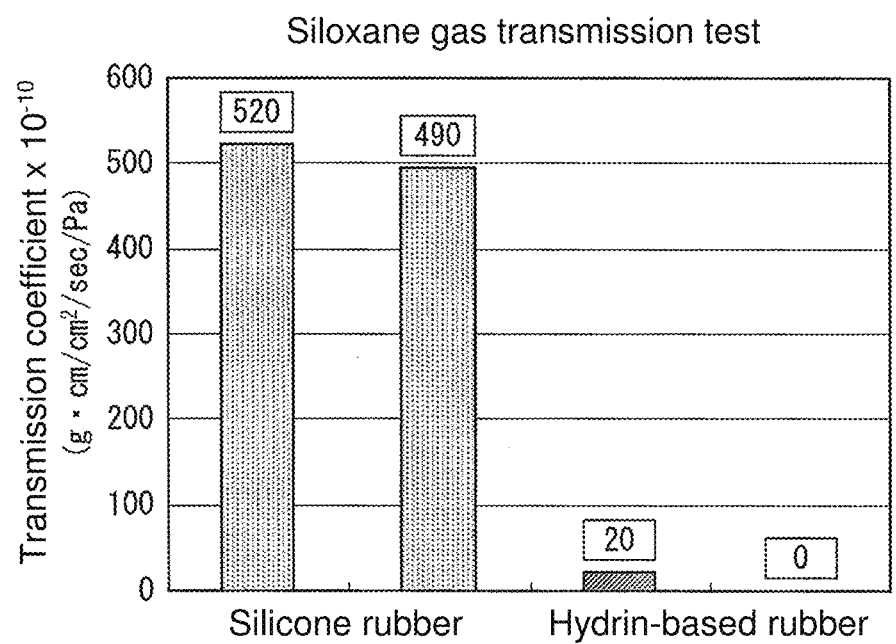
FIG. 4 is an illustration showing results of a siloxane gas transmission test on a hydrin-based rubber and a silicone rubber.

FIG. 4 shows results of a siloxane gas transmission test on a hydrin-based rubber (rubber material) and a silicone rubber (rubber material). In this test, evaluation for gas transmission was carried out by an equal-pressure method with reference to MJIS K7126 (Plastics—Film and sheeting—Determination of gas-transmission rate). This method is used only for evaluation of target gas transmission property. For the evaluation, a target gas was supplied to the space on one side of a specimen while maintaining equal pressure of both sides of the specimen, and the transmitted target gas was measured by various ways of detection.

Figure 5:
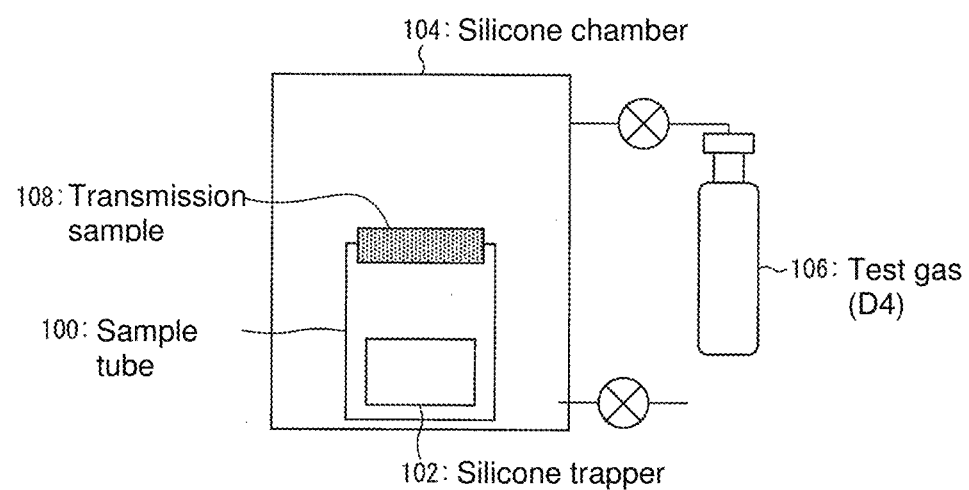
FIG. 5 is an illustration showing an experimental system used for the siloxane gas transmission test.

FIG. 5 shows an experimental system used for the siloxane gas transmission test. In this case, a trap method was employed as a way of detection to measure the amount of transmission through a transmission sample by weight measurement. Specifically, a silicone trapper 102 was placed in a sample tube 100, and the mouth of the sample tube 100 was covered with a transmission sample 108 to prepare a measuring object.

To prepare a transmission sample 108 of a hydrin-based rubber, EPION-301 (GECO, available from DAISO CO., LTD.) was used. For a transmission sample 108 of a silicone rubber, KE-9511 (a silicone rubber, available from Shin-Etsu Chemical Co., Ltd.) was used. Two measuring objects were prepared with the former transmission sample 108, and another two prepared with the latter. A plasticizer may be used to keep the plasticity of a rubber under a low temperature. The plasticizer may be added to the rubber for forming, for example, the rubber cap 16 so as to allow smooth vertical motion of the push button 14.

Next, the prepared measuring object was placed in a silicone chamber 104, and a test gas 106 was supplied into the silicone chamber 104. The measuring object was left to stand for a predetermined time in an atmosphere of the test gas 106. Herein, the test gas 106 used was a D4 reagent, and the measuring object was left to stand for 126 hours under the following conditions: the concentration of the test gas 106 in the silicone chamber 104 (ambient environment): 25 ppm, and the temperature inside of the silicone chamber 104 (ambient temperature): 80° C. After the elapse of a predetermined period of time, the silicone trapper 102 was taken out of the sample tube 100. The silicone trapper 102 was then subjected to heat treatment, followed by weight measurement. The amount of weight change was used to measure the adsorbed silicone, and the transmission coefficient was calculated (Reference: Takeo Yasuda, Method for Testing Dynamic Characteristics of Plastic Materials and Evaluation Results (5), Plastics; The Japan Plastics Industry Federation, edited by "Plastics" editorial committee).

As shown in FIG. 4, both of the two silicone rubber measuring objects transmitted $490 \times 10^{-10}$ g·cm²/sec/Pa or more of the siloxane gas (D4 reagent). On the other hand, the amount of the siloxane gas (D4 reagent) transmitted was zero with regard to one of the two hydrin-based rubber measuring objects, and nearly zero with regard to the other. Incidentally, a slight amount of the siloxane gas was detected on one of the hydrin-based rubber. Given the degree of precision of the experimental system or other factors, however, such an amount should be considered within the range of error.

Figures 6, 7:
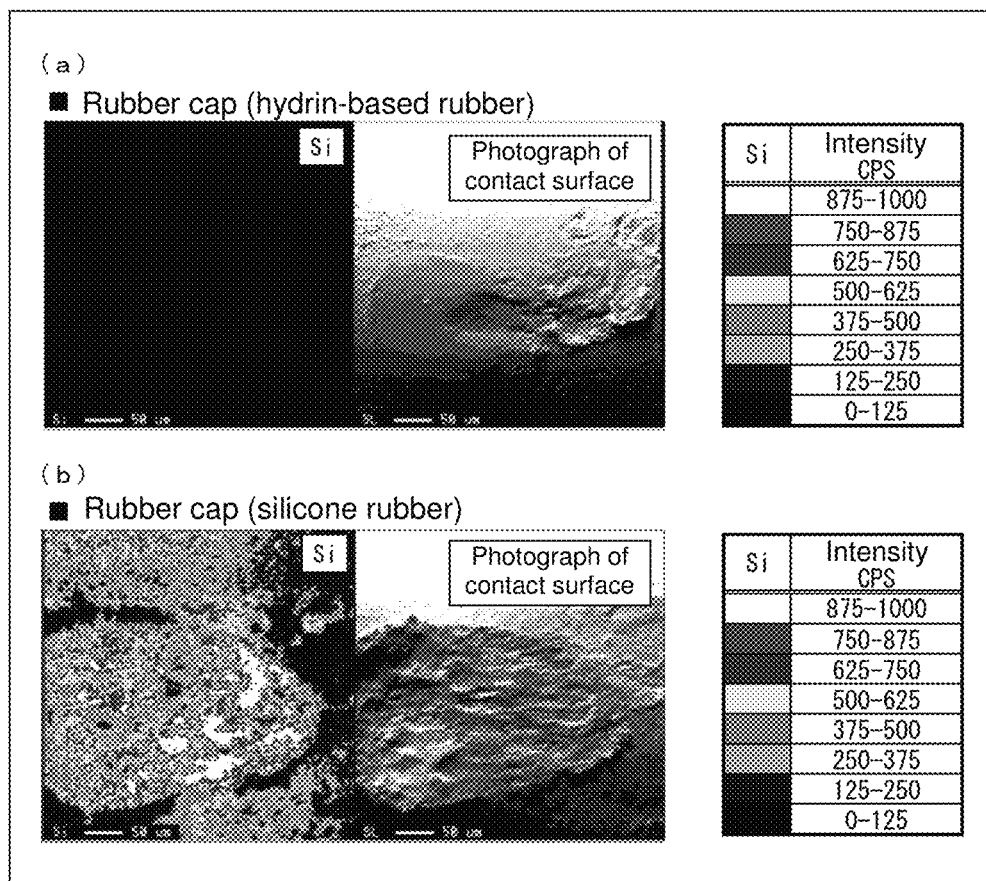
FIGS. 6 (*a*) and (*b*) are illustrations showing results of an electrical switching test on microswitches conducted in a siloxane gas atmosphere: (*a*) shows results obtained from a working example; and (*b*) shows results obtained from a comparative example.
FIG. 7 is an illustration showing results of an oil resistance test on hydrin-based rubber and silicone rubber.

In FIGS. 6, (a) and (b) show results of an electrical switching test on microswitches conducted in a siloxane gas atmosphere. Test objects used were a microswitch of a working example having the rubber cap 16 made of a hydrin-based rubber GECO, and a microswitch of a conventional example having a rubber cap made of a silicone rubber (secondarily vulcanized). The electrical switching test was conducted on the switches in a siloxane gas atmosphere to compare surface changes of the contacts in the microswitches.

FIGS. 6 (a) and (b) show data for contact surface changes; that is, they show results obtained by measuring the Si intensity (CPS) on the contact surfaces with an X-ray diffractometer, and also show photographs of the contact surfaces taken with an electron microscope. In FIGS. 6, (a) and (b) show results of a working example and of a conventional example, respectively.

As is manifestly apparent from comparison of the contact surfaces in the photographs of FIGS. 6 (a) and (b), there is shown extraneous matter deposited on the surface of the contact in the conventional microswitch, making the surface rough. The Si intensity measurement result indicates that the extraneous matter is Si, i.e. silicon oxide. On the other hand, with regard to the microswitch of the working example, the photograph shows the contact surface retains smoothness, and the Si intensity measurement result indicates that no silicon oxide is deposited on the surface.

As seen from the above, a hydrin-based rubber is used as a material to form the rubber cap 16 that seals the sliding part of the push button 14, thereby making it possible to effectively suppress the entry of a siloxane gas or the like into the case through the rubber cap 16.

Meanwhile, as described above, it is a matter of course that the rubber cap 16 should be made of a material that blocks a siloxane gas from passing therethrough, but that is not enough. The material of the rubber cap 16 also needs to have the resistance to grease or other oils, i.e. the oil resistance that is comparable to a silicone rubber.

FIG. 7 shows results of an oil resistance test on a hydrin-based rubber and a silicone rubber. In this test, three types of grease were used, namely, olefin-based, paraffin-based, and ester-based grease. In these three types of grease, the following rubbers were immersed at 90° C. for 96 hours: the rubbers used were two types of hydrin-based rubbers, denoted by #1 and #2; and the same silicone rubber as used for the above-mentioned siloxane gas transmission test. After the immersion, the rubbers were weighed, and the rate of weight change (%) was calculated. The hydrin-based rubber #1 is a rubber prepared by adding 20 parts by weight of ADK CIZER RS-705, which is an ether-based plasticizer, to 100 parts by weight of EPICHLOMER CG102 (available from DAISO CO., LTD.) which is GECO. The hydrin-based rubber #2 is a rubber such that the amount of ADK CIZER RS-705 is reduced by half to 10 parts by weight.

As shown in FIG. 7, the silicone rubber is increased in weight, indicating absorption of the respective types of grease. A silicone rubber has the property of absorbing grease into the rubber material, but not to a troublesome degree. On the other hand, the hydrin-based rubbers #1 and #2 are decreased in weight, indicating no absorption of any type of grease. As seen above, a hydrin-based rubber does not have the property of absorbing grease into the rubber material. Thus, the hydrin-based rubber has no risk for swelling by absorption of grease, unlike the ethylene/propylene-based copolymer rubber used in the gasket of Patent Document 2.

Incidentally, the decrease in weight of the hydrin-based rubbers #1 and #2 can be attributed to leakage of an additive from the rubber material. This is also indicated by the fact that the hydrin-based rubber #1 containing a larger amount of the plasticizer shows higher rate of weight change than the hydrin-based rubber #2. The additive leakage level that is observed in the hydrin-based rubbers #1 and #2 is harmless to the quality of the rubber material.

Finally, FIG. 8 shows results of Gehman torsion test in which the rubbers were tested for their flexibility under a low-temperature environment, the flexibility required for the rubber cap when used under a low-temperature environment. In consideration of the use of the microswitch under a low-temperature environment, it is necessary for the rubber to have the same level of low-temperature flexibility as a silicone rubber, in order to maintain the close-fitting property and the push button-operability.

The Gehman torsion test (low-temperature torsion test): JIS K 6261 will be described. This test is carried out as follows. A top of a rubber specimen is attached to a wire which is set at a certain torsion constant. Subsequently, the tip of the wire is twisted to give torsion to the specimen. Then, the torsional angle (X) of the top of the specimen is determined. The relationship between the temperature and the determined angle X is graphed to obtain the freezing point and the softening point. Generally, the temperature points to be determined are the temperatures T2, T5, T10, and T100 at which the specific modulus (180−X)/X is twice, 5 times, 10 times, and 100 times higher than that obtained at a normal temperature.

The rubbers used in this test were the two types of hydrin-based rubbers #1 and #2 and a silicone rubber which were used in the above-mentioned oil resistance test. These rubbers were used to determine the temperatures T2, T5, T10, T100, and Tg. T2: Up to around this temperature, the rubber may be deemed to maintain the same level of rubber elasticity as that obtained at room temperature. T5 and T10: In this temperature region, a slight change in temperature causes significant change in modulus of rigidity, indicating that this region is a glass transition temperature region. T100: At this temperature, the rubber is almost frozen, and is in a glassy state. Tg: Glass transition temperature; the temperature at which the rubber changes from a glassy state to a rubbery state.

As shown in the results of the two types of hydrin-based rubbers #1 and #2, the hydrin-based rubber #1 with a larger amount of the plasticizer has generally lower temperatures than the hydrin-based rubber #2 having a smaller amount of the plasticizer. This indicates that the rubber #1 can retain the flexibility at a lower temperature. That is, in order to improve the flexibility at a low temperature, preferably a larger amount of the plasticizer is added to the rubber. Further, as can be seen from the results of the hydrin-based rubbers #1, #2 and the results of the silicone rubber, both of the hydrin-based rubbers #1 and #2 achieve the low-temperature flexibility comparable to or better than the silicone rubber.

It should be noted that, in the case of practical formation of a rubber cap from the rubber material, the appropriate thickness range depends on the kind of the rubber material. Therefore, the low-temperature flexibility level observed in the specimen does not directly apply to results of rubber cap testing. However, it should be noted that the hydrin-based rubber as a rubber material has achieved the outcome comparable to or better than the silicone rubber. Thus, with a little ingenuity in selecting the thicknesses and shapes of the rubber cap, it is quite possible to provide a rubber cap made of a hydrin-based rubber with the close-fitting property and push button-operability comparable to those of a rubber cap made of a silicone rubber.

The amount of the ether-based plasticizer added to the hydrin-based rubber is preferably 5 to 40 parts by weight based on 100 parts by weight of the rubber. When the amount exceeds 40 parts by weight, the additive leakage is undesirably increased due to adhesion of grease or other oils. When the amount is smaller than 5 parts by weight, the effect of the plasticizer is decreased, so that sufficient flexibility of the rubber may not be expected under a low temperature environment.

The ether-based plasticizer added in the above-mentioned amount can impart the rubber cap with the close-fitting property and push button-operability comparable to those obtained from a silicone rubber, while maintaining the oil resistance, even under a low-temperature environment of −40° C.

In the microswitch 1, as described above, a hydrin-based rubber is used as a material for the rubber cap that seals a sliding part of the actuator.

Accordingly, even if the microswitch 1 is used under such an environment that a siloxane gas is volatilized from a silicone-based material, the siloxane gas is prevented from entering the case through the rubber cap 16, so that the deposition of a silicon oxide may be effectively prevented from occurring on a surface of the contact in the snap-action type switching mechanism 12. Thus, the contact failure can be reduced.

Furthermore, even if the microswitch 1 is used under such an environment that a grease agent is likely to adhere to the rubber cap, the use of a hydrin-based rubber makes it possible to avoid deterioration of the rubber cap 16 due to absorption of the adherent grease. Thus, the sealed structure can be maintained for a long period of time.

As described above, in one aspect, the electronic component of the present invention includes: a case; a switching mechanism incorporated within the case; an actuator configured to actuate the switching mechanism, the actuator mounted in the case so as to slidingly displace; and a rubber cap configured to seal a sliding part of the actuator, in which the rubber cap is made of a hydrin-based rubber.

In another aspect, an ether-based plasticizer is preferably added to the hydrin-based rubber so that the amount of the ether-based plasticizer is 5 to 40 parts by weight based on 100 parts by weight of the rubber, in the electronic component of the present invention.

The ether-based plasticizer added in such an amount can impart the rubber cap with the close-fitting property and push button-operability comparable to those obtained from a silicone rubber, while maintaining the oil resistance, even under a low-temperature environment of −40° C.

In another aspect, the hydrin-based rubber is preferably epichlorohydrin-ethylene oxide-allyl glycidyl ether terpolymer, in the electronic component of the present invention.

Of hydrin-based rubbers, epichlorohydrin-ethylene oxide-allyl glycidyl ether terpolymer has the best balance between cold resistance and oil resistance, and thus is preferred.

In another aspect, the electronic component of the invention may be an electronic component including: a base having a plurality of terminals fixed thereto; and the base formed to fit with a case, in which the switching mechanism is incorporated within a space enclosed by the base and the case, and the switching mechanism includes a movable piece, the movable piece configured to move in response to displacement of an actuator which is mounted in the case so as to be displaceable by sliding, and to provide snap-action movement to switch on or off the conduction between the terminals.

The present invention can be utilized for a microswitch or the like.

The invention claimed is:
1. An electronic component comprising:
a case;
a switching mechanism incorporated within the case;
an actuator configured to actuate the switching mechanism, the actuator being mounted in the case so as to be displaceable by sliding; and
a rubber cap configured to seal a sliding part of the actuator, wherein the rubber cap is resistant against a permeability of siloxane gas and is made of a hydrin-based rubber;
wherein the hydrin-based rubber consists essentially of epichlorohydrin homopolymer or epichlorohydrin-ethylene oxide copolymer or epichlorohydrin-ethylene oxide-allyl glycidyl ether terpolymer; and
wherein an ether-based plasticizer is added to the hydrin-based rubber in an amount of 5 to 40 parts by weight based on 100 parts by weight of the rubber.

2. The electronic component according to claim 1, further comprising:
a base having a plurality of terminals fixed thereto; and
the base formed to fit with the case, wherein
the switching mechanism is incorporated within a space enclosed by the base and the case, and
the switching mechanism comprises a movable piece, and
the movable piece configured to move in response to displacement of the actuator and to provide snap-action movement to switch on or off the conduction between the terminals.

3. An electronic component, comprising:
a case;
a switching mechanism incorporated within the case;
an actuator configured to actuate the switching mechanism, the actuator being mounted in the case so as to be displaceable by sliding; and
a rubber cap configured to seal a sliding part of the actuator;
wherein the rubber cap is resistant against a permeability of siloxane gas and is made of a hydrin-based rubber; and
wherein the hydrin-based rubber consists essentially of epichlorohydrin homopolymer or epichlorohydrin-ethylene oxide copolymer or epichlorohydrin-ethylene oxide-allyl glycidyl ether terpolymer.

4. The electronic component according to claim 3, further comprising:
a base having a plurality of terminals fixed thereto; and
the base formed to fit with the case, wherein
the switching mechanism is incorporated within a space enclosed by the base and the case, and
the switching mechanism comprises a movable piece, and
the movable piece configured to move in response to displacement of the actuator and to provide snap-action movement to switch on or off the conduction between the terminals.

5. The electronic component of claim 3, wherein an ether-based plasticizer is added to the hydrin-based rubber in an amount of 5 to 40 parts by weight based on 100 parts by weight of the rubber.

* * * * *